United States Patent

Engelhardt et al.

(10) Patent No.: US 6,614,525 B1
(45) Date of Patent: Sep. 2, 2003

(54) LASER SCANNING MICROSCOPE WITH SINGLE WAVELENGTH EXCITATION

(75) Inventors: Johann Engelhardt, Bad Schoenborn (DE); Joachim Bradl, Schriesheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 218 days.

(21) Appl. No.: 09/718,948

(22) Filed: Nov. 20, 2000

(30) Foreign Application Priority Data

Nov. 22, 1999 (DE) .......................... 199 56 027
Jan. 18, 2000 (DE) .......................... 100 01 954

(51) Int. Cl.$^7$ .......................... G01J 3/30; G01N 21/64
(52) U.S. Cl. ............ 356/318; 250/458.1; 250/461.2
(58) Field of Search ................ 356/318, 417, 356/317; 250/332, 458.1, 459.1, 461.2, 461.1

(56) References Cited

U.S. PATENT DOCUMENTS

| | | | |
|---|---|---|---|
| 4,745,285 A | * 5/1988 | Recktenwald et al. ... | 250/458.1 |
| 4,827,125 A | 5/1989 | Goldstein ................ | 250/234 |
| 4,965,152 A | 10/1990 | Keys et al. ............... | 430/1 |
| 5,224,058 A | * 6/1993 | Mickaels et al. .......... | 356/39 |
| 5,252,834 A | * 10/1993 | Lin ......................... | 250/458.1 |
| 5,377,004 A | * 12/1994 | Owen et al. .............. | 356/301 |
| 5,410,371 A | 4/1995 | Lambert .................. | 348/769 |
| 5,852,498 A | * 12/1998 | Youvan et al. ............ | 356/417 |
| 6,326,144 B1 | * 12/2001 | Bawendi et al. .......... | 250/216 |
| 6,355,934 B1 | * 3/2002 | Osgood et al. ........... | 250/216 |
| 6,483,581 B1 | * 11/2002 | Ben-Amotz et al. ...... | 356/301 |

FOREIGN PATENT DOCUMENTS

| | | |
|---|---|---|
| DE | 43 30 447 C2 | 3/1995 |
| DE | 196 27 568 A1 | 1/1998 |

\* cited by examiner

*Primary Examiner*—F. L. Evans
*Assistant Examiner*—Kara Geisel
(74) *Attorney, Agent, or Firm*—Simpson & Simpson, PLLC

(57) ABSTRACT

A laser scanning microscope, preferably a confocal laser scanning microscope, having a laser light source for illuminating a specimen and a detector for detecting the light returning from the specimen, the specimen or parts thereof. The specimen is marked with markers that can be excited to emit. For the specific detection of preferably biological specimen structures, with high localization accuracy for the specimen structures, the laser light source emits exciting light substantially at one wavelength. Different markers emit light of different wavelengths, when irradiated with exciting light of substantially the same wavelength. The detector is embodied as a multi-band detector for the simultaneous detection of light at several wavelengths. A corresponding method for the detection of preferably biological specimens or specimen structures by laser scanning microscopy is described.

34 Claims, 3 Drawing Sheets

LASER SCANNING MICROSCOPE WITH SINGLE WAVELENGTH EXCITATION

CROSS REFERENCE TO RELATED APPLICATIONS

This invention claims priority of a German patent application DE 199 56 027.7 filed Nov. 22, 1999 which is incorporated by reference herein.

FIELD OF THE INVENTION

The invention concerns a laser scanning microscope, preferably a confocal laser scanning microscope, having a laser light source for illuminating a specimen and a detector for detecting the light returning from the specimen, the specimen or parts thereof being marked with markers that can be excited to emit. The present invention furthermore concerns a method for detecting preferably biological specimens or specimen structures by laser scanning microscopy, in particular using the laser scanning microscope according to the present invention.

BACKGROUND OF THE INVENTION

Laser scanning microscopes of the generic type have been existing art for years. Purely by way of example, reference is made in this context to DE 196 27 568 A1. The aforesaid document discloses a confocal laser scanning microscope according to which, for confocal high-contrast imaging, simultaneous confocal illumination of a specimen plane is possible with a plurality of suitably diverging light spots and with associated imaging members and a plurality of pinholes. The light sources are coupled in via diffractive elements.

Reference is also made to U.S. Pat. Nos. 4,827,125 and 5,410,371; with the laser scanning microscopes described therein, active optical elements are provided in the beam path. U.S. Pat. No. 4,965,152 describes holographic notch filters.

The starting point for the teaching claimed here, however, is multicolor fluorescence microscopy in the context of confocal laser scanning microscopy. In this, a variety of marking methods are used to bind fluorescent dye molecules specifically to biological specimens. Purely by way of example, reference is made to the known "fluorescent in-situ hybridization" (FISH) method.

The fluorescent dye molecules usually used for marking are problematic because of their bleaching behavior over time. The longer they are impinged upon by the fluorescence-exciting light, for example laser light, the lower their emission and the resulting fluorescence. In addition, in the case of multiple marking (i.e. marking with different fluorescent dye molecules), different emission wavelengths are necessary in order to excite each of the different fluorescent dyes, because of their relatively narrow absorption spectrum, with the appropriate or "correct" excitation wavelength. In confocal laser scanning microscopy, this requires the utilization of multiple lasers with different exciting light wavelengths, as well as the use of complex and thus expensive filter systems.

A further problem in marking with conventional fluorescent dyes lies in the extremely wide emission spectrum of the fluorescent dyes in the longer-wavelength region. In the case of simultaneous multiple marking with different fluorescent dyes, this results in so-called "crosstalk" in the individual detection channels, meaning that a detection channel detects a spectral component of the detected fluorescent light being detected that, because of its spectral properties, should not at that time be detected by that detection channel.

When conventional fluorescent dyes are used for marking, the aforementioned bleaching rate creates the greatest disadvantage for the user, especially since the bleaching rate very considerably limits the maximum number of possible images and thus the attainable signal-to-noise ratio of a specimen region.

In addition, in the multi-band detectors used in this context, scattered light is limiting in terms of the attainable optical dynamic range. The principle of the multi-band detector is described in DE 43 30 447. Exciting light that is reflected and/or scattered from the specimen is largely blocked out of the detection beam path by a dichroic beam splitter. Nevertheless, a not inconsiderable portion of the exciting light makes its way into the multi-band detector and, because of the detection principle therein (using a prism), is distributed in the form of scattered light over all detection channels. Because of this situation, the optical dynamic range detectable with a multi-band detector is limited. A wider dynamic range is achievable with special filter devices, and moreover is a prerequisite for many applications.

SUMMARY OF THE INVENTION

It is thus the object of the present invention to configure and develop a laser scanning microscope of the generic type in such a way that the specific detection of preferably biological specimen structures is possible with high localization accuracy for the specimen structures, in particular avoiding the crosstalk that otherwise occurs in conventional multicolor fluorescence microscopy. A further object of the present invention is to describe a method for the detection of preferably biological specimens or specimen structures with high localization accuracy for the specimen structures.

The aforesaid object is achieved, in terms of the laser scanning microscope according to the present invention, by the features of the appended claims. According to the latter, a laser scanning microscope of the genus is characterized in that the laser light source emits exciting light substantially at one wavelength; that different markers which emit light of different wavelengths when irradiated with exciting light of substantially the same wavelength are used simultaneously; and that the detector is embodied as a multi-band detector for the simultaneous detection of light at several wavelengths.

What has been recognized according to the present invention is that instead of using several laser light sources, or a complex laser with several wavelengths, it is also easily possible to use one laser light source that emits exciting light at substantially a single wavelength. It is nevertheless possible to detect and image different specimen structures or different regions of the specimen structures simultaneously. This is possible if different markers, which emit light of a different wavelength for each type of marker when irradiated with exciting light of substantially the same wavelength, are used simultaneously; and if the detector is configured as a multi-band detector for simultaneous detection of light at several wavelengths.

The invention involves a combination of features with a synergistic effect. Specifically, if the markers used are very particular ones that, when irradiated with exciting light, emit light of a different wavelength for each type of marker, it is then unnecessary to use different lasers or a complex laser with different wavelengths. It is thus now possible to use one laser light source that emits exciting light at substantially one wavelength. That wavelength is sufficient to bring about emissions at different wavelengths (of the respective markers). A further building-block of the claimed combination of features is the multi-band detector that is to be used, which provides simultaneous detection of light at several wavelengths, the light at different wavelengths being emitted as a result of excitation of the markers.

Advantageously, there is arranged in the illumination/detection beam path of the laser scanning microscope an optical component that reflects the exciting light arriving from the laser light source toward the specimen, and allows light of a different wavelength, in particular the light returning or emitted from the specimen, to be transmitted toward the detector. The optical component can be, for example, an acousto-optical beam splitter (AOBS), which makes possible the excitation of different markers with different intensities of the excitation wavelength. The signal-to-noise ratios of the various markers can thereby be coordinated with or matched to one another.

The optical component can advantageously be a filter, for example a long-pass filter or a holographic notch filter. This filter is inserted in place of the dichroic beam splitter otherwise used at that point.

In additionally advantageous fashion, the spectral region of the individual channels of the multi-band detector is adjustable to the wavelength of the emitted light of the markers used. Crosstalk in the detection channels can be minimized by adjusting the spectral regions of the detection channels.

The very particular markers that are used are advantageously semiconductor nanocrystals. In the FISH application, these semiconductor nanocrystals usually have a diameter of approx. 2 to 10 nm, and emit light at a particular wavelength upon excitation with exciting light of one wavelength. It is also conceivable for different semiconductor nanocrystals to emit light at several wavelengths upon excitation with exciting light at one wavelength.

The markers could also be fluorochromes which, as a result of their specific absorption spectrum, can be excited to fluoresce by the exciting light of one emission wavelength.

It is also conceivable to provide several light sources, so that the markers are excited with exciting light of different wavelengths. Excitation of the markers with several light sources would be advantageous in particular if different semiconductor nanocrystals emit fluorescent light at different intensities, since then the light intensity of the exciting light sources can be adjusted in such a way that the emitted light of the various semiconductor nanocrystals now exhibits similar dynamic ranges, and the signals thus detected exhibit a similar signal-to-noise ratio. In this instance the use of an acousto-optical beam splitter (AOBS) to separate the exciting light and detected light would be advantageous.

The advantages of the marking provided in accordance with the present invention may be seen in the fact that the markers used here have a narrow emission spectrum, so that when several different markers are used (for example, semiconductor nanocrystals), the disadvantageous crosstalk can be reduced. Several different semiconductor nanocrystals could be excited with a single wavelength, so that a quasi-continuous absorption spectrum can be assumed here. One laser light source is sufficient for operation of the laser scanning microscope claimed here, a long-pass filter or holographic notch filter being used instead of the otherwise usual dichroic beam splitter.

The semiconductor nanocrystals that are preferably to be used here as markers can be bound specifically to biological specimens, so that multicolor applications are possible based on the differing emission characteristics. In addition, the semiconductor nanocrystals exhibit a substantially lower bleaching rate than conventional fluorescent dyes. The size of the semiconductor nanocrystals is smaller than the size of the fluorescent molecules, so that specific binding of the semiconductor nanocrystals is qualitatively better, the reason being that the semiconductor nanocrystals can be attached more closely than fluorescent molecules to the actual specimen or specimen region. This yields better localization accuracy.

The "lifetime" of the excited state of the semiconductor nanocrystals is extremely long compared to the lifetimes of conventional fluorescent dyes, being several hundreds of ns. This property of the semiconductor nanocrystals could be used to reduce or eliminate return reflections and/or scattered light in the undesired exciting light coming from the specimen. For that purpose, excitation of the markers could be accomplished with the aid of pulsed or intensity-modulated exciting light of a suitable excitation wavelength, for example with a pulsed laser. Intensity modulation of the exciting light, in the case where a light source with a constant emission intensity is used, could be achieved with an active or passive optical component, rapid intensity modulation preferably being achievable with an active optical component, for example an acousto-optical tunable filter (AOTF). Synchronization of the pulsed or intensity-modulated exciting light with the scanning and/or detection operation of the laser scanning microscope could be provided for that purpose. This synchronization makes possible excitation of the markers with pulsed or intensity-modulated exciting light specifically at the time when the scanning device of the laser scanning microscope is also actually illuminating the specimen region that is to be detected. Starting from the moment of a light pulse of this kind, i.e. concurrently with the excitation of markers on the specimen region to be detected, the fluorescent light emitted by the markers can be detected for an adjustable measurement period either immediately or after a short offset in time.

Ideally, the offset in time can be adjusted so as to maximize the signal yield of the markers being detected. A corresponding offset in time could be achieved by way of a lateral offset of the detection pinhole in the detection beam path which results from the total magnification of the imaging system and the scanning speed. A corresponding artificially introduced detector "dead time," with no change in the pinhole position, would also be conceivable. The detector can thus detect only the fluorescent light from the markers, but not the undesired return reflection or undesirable scattered light of the exciting light. This procedure advantageously makes possible the use of an optical filter than is nonspecific with regard to the wavelengths used, rather than the dichroic beam splitter normally used. The nonspecific optical filter could have, for example, a transmission capability of more than 80% and a reflection capability of less than 20% for the entire wavelength range, which reduces material costs.

The long lifetime (several hundreds of ns) of the markers, in particular of the semiconductor nanocrystals, nevertheless has a limiting effect in terms of the maximum detectable signal yield. If the exciting light of the laser scanning microscope has at the focus an average dwell time of, for example, 2 $\mu$s at a specific specimen position, the markers with a long lifetime do not pass through as many excitation and emission cycles as would be the case with a shorter lifetime of, for example, 10 ns. In this example, therefore, the light emitted by the markers is decreased by a factor of 10 or the saturation rate of the markers is reached 10 times as fast. One reason for the long lifetime of the markers is that the fluorescent molecule or semiconductor nanocrystal is in an excited state from which a transition back to the ground state is forbidden by pulse and energy conservation laws. In order nevertheless to decrease the lifetime of the excited fluorescent molecules or semiconductor nanocrystals and to accelerate the transitions into the ground state, electromagnetic energy is delivered into the focus region with an additional energy source. This makes it possible to induce rotational pulse or spin transitions, so that the transition into the ground state is then no longer forbidden. The transition into the ground state thus occurs spontaneously, which corresponds to a decrease in lifetime.

The introduction of additional electromagnetic energy into the focus point could be achieved, in the case of spin resonance, by way of a suitable transmitter in the radio-frequency wavelength region, which could, for example, be integrated directly into the microscope stand instead of the condenser. The energy to be delivered can have a wavelength that is selected, as a function of the type of marker used, from a region that can extend from the radio-frequency wavelength region to the visible or even the UV wavelength region. If, for example, additional visible light is to be introduced as the additional electromagnetic energy, this could be accomplished by way of a suitable additional light source (e.g. laser), which is coaxially superimposed on the actual exciting light. It would also be possible to couple in one or more additional modes of the single (laser) light source that is used, the energy difference between the modes being adapted to the energy transition that needs to be attained.

The additionally introduced electromagnetic energy could also be pulsed or intensity-modulated, and moreover could be synchronizable with the scanning and/or detection operation of the laser scanning microscope. In particular, the pulse sequence or intensity modulation sequence of the electromagnetic radiation can exhibit an adjustable offset in time from the pulse sequence or intensity modulation sequence of the exciting light. This offset in time can be selected so as to maximize the signal yield from the markers that are to be detected.

Square-wave, sawtooth, or triangular profiles, and periodically recurring or random intensity profiles, are conceivable as intensity profiles over time of the pulsed or intensity-modulated exciting light and/or of the additionally introduced electromagnetic energy.

With regard to the method claimed, the aforesaid object is achieved by the features of the appended claims. According to the latter, a method for the detection of preferably biological specimens or specimen structures by laser scanning microscopy, the specimen being illuminated with a laser light source and the light returning from the specimen being detected by a detector, and the specimen or specimen structures being marked with markers that can be excited to emit, is characterized in that the laser light source emits exciting light at one wavelength; and that different markers which emit light of different wavelengths when irradiated with exciting light of substantially the same wavelength are used simultaneously. With regard to the individual method steps, reference is made to the description above of the laser scanning microscope that is claimed, and to the claims relevant to the method.

BRIEF DESCRIPTION OF THE DRAWINGS

There are various ways of advantageously embodying and developing the teaching of the present invention. Reference is made, for that purpose, on the one hand to the claims which follow, and on the other hand to the explanation below of exemplary embodiments of the invention with reference to the drawings. In conjunction with the explanation of the exemplary embodiments of the invention with reference to the drawings, a general explanation is also given of preferred embodiments and developments of the teaching. In the drawings:

DETAILED DESCRIPTION OF THE INVENTION

Figure 1:
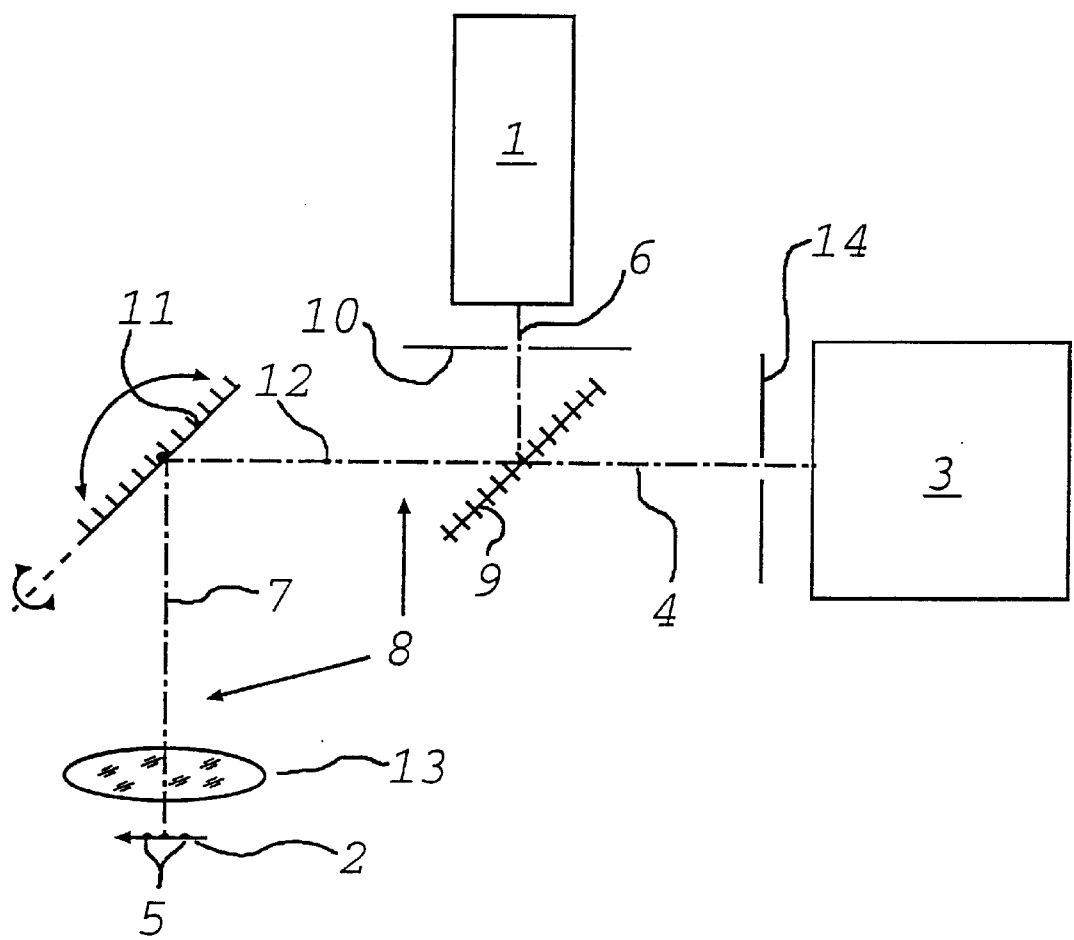
FIG. 1 shows, in a schematic depiction, the general configuration of a laser scanning microscope according to the present invention, according to which a specimen marked with different markers can be excited with exciting light of only one excitation wavelength.

FIG. 1 shows, in a schematic depiction, an exemplary embodiment of a laser scanning microscope according to the present invention, being in this context a confocal laser scanning microscope. The laser scanning microscope comprises a laser light source 1 for illuminating a specimen 2, and a detector 3 for detecting light 4 returning from specimen 2. FIG. 1 merely indicates that specimen 2 or portions thereof are marked with markers 5 that can be excited to emit. The depiction of markers 5 is merely symbolic.

According to the present invention, laser light source 1 emits exciting light 6 at substantially one wavelength. Different markers 5 which emit light 7 of different wavelengths when irradiated with exciting light 6 of substantially the same wavelength are used simultaneously. Detector 3 is a multi-band detector for simultaneous detection of light 7 and 4 at several wavelengths.

FIG. 1 further shows that there is arranged in illumination/detection beam path 8 an optical component 9 which reflects exciting light 6 coming from laser light source 1 toward specimen 2, and allows light of other wavelengths, in particular light 4 returning from specimen 2, to be transmitted toward detector 3. Optical component 9 is a filter, concretely a holographic notch filter, which is depicted merely symbolically in FIG. 1.

What is essential is that the simultaneous use of different markers 5, in particular different semiconductor nanocrystals, is possible with a modified laser scanning microscope. Since the variously emitting semiconductor nanocrystals, because of their specific properties, can be excited to emit or fluoresce using the same wavelength, it is possible to use a single laser light source 1. This reduces the cost of the overall system, since it is no longer necessary to use several laser light sources or to use a special laser with exciting light of different wavelengths.

It is furthermore evident from FIG. 1 that exciting light 6 from laser light source 1 passes through an excitation pinhole 10 arranged after laser light source 1, and strikes filter 9. Filter 9 is designed so that it can transmit light of all wavelengths with the exception of the extremely narrow spectral region of laser light source 1. Exciting light 6 of laser light source 1 is reflected toward a scanning mirror 11, and passes through an objective 13 along optical axis 12. The fluorescent light excited by laser light source 1 and collected by objective 13, from the semiconductor nanocrystals in specimen 2 used here as markers 5, or emitted light 7, passes through illumination/detection beam path 8 in the opposite direction until it strikes holographic notch filter 9. This filter 9 allows a portion 4 of emitted light 7 coming from specimen 2 to pass, so that fluorescent light contributions from the focal region can pass, in accordance with the confocal detection principle, through a downstream detection pinhole 14. In multi-band detector 3, the returning light 4 or fluorescent light is further processed in known fashion in accordance with its spectral properties, and is simultaneously or sequentially detected as in the case of ordinary multicolor fluorescence microscopy.

Since the holographic notch filter is capable of efficiently filtering out the excitation wavelength of exciting light 6, further suppression of the otherwise interfering scattered light can be achieved.

Be it noted furthermore that because of the differing emission intensities of the fluorescent light from various semiconductor nanocrystals, it is entirely advantageous to use a confocal laser scanning microscope having an AOBS. Various semiconductor nanocrystals with different wavelengths can be excited depending on the emission intensities of the fluorescent light, several light sources being necessary for the purpose. The detected signals could then have an approximately identical signal-to-noise ratio. The aforementioned holographic notch filter could in this context be replaced by the AOBS, so that individual laser wavelengths can be varied in intensity.

Figure 2:
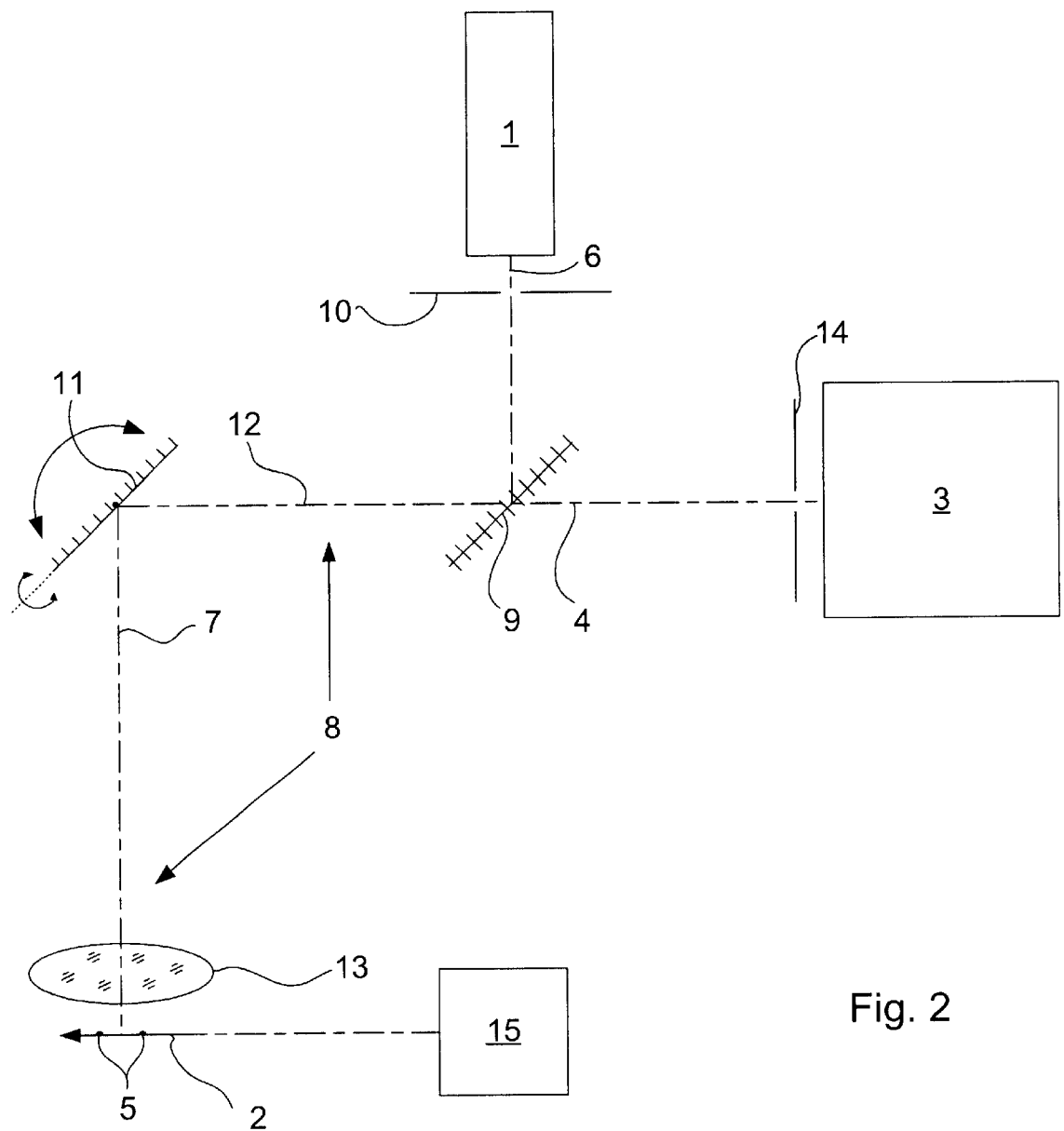
FIG. 2 shows, in a schematic depiction, a second embodiment of the present invention comprising an additional energy source for exciting the markers; and, FIG. 3 shows, in a schematic depiction, a third embodiment of the present invention comprising an additional energy source for exciting the markers.

FIG. 2 shows a second embodiment of the invention comprising additional energy source 15. Source 15 comprises a source of pulsed or intensity-modulated exciting light of a suitable excitation wavelength, for example with a pulsed laser a suitable transmitter in the radio-frequency wavelength region. The wavelength is selected as a function of the type of marker used. The wavelengths can vary from the radio-frequency wavelength region to the visible or even the UV wavelength region.

Figure 3:
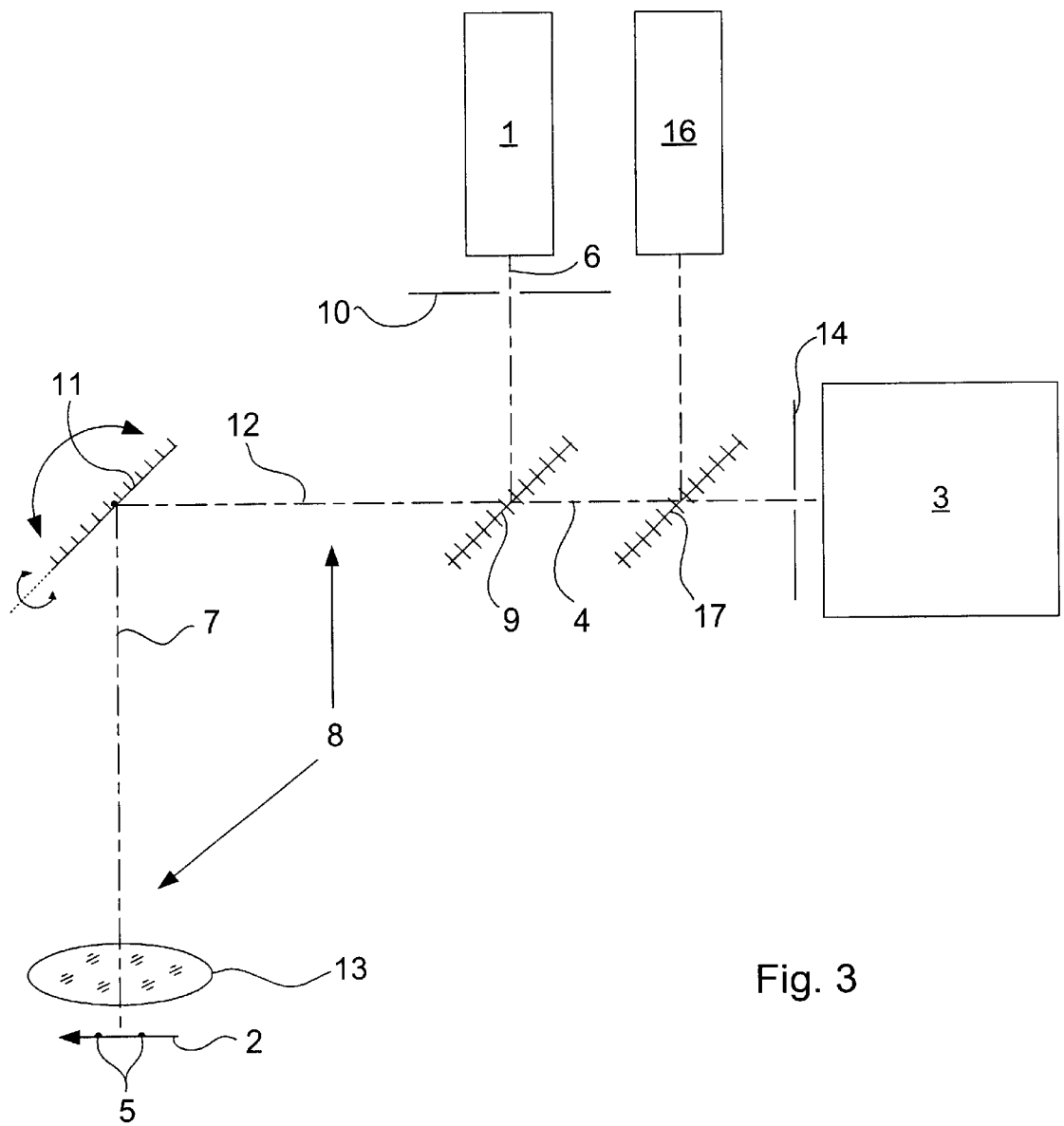

FIG. 3 shows a third embodiment of the present invention wherein additional radiation source 16 (e.g. laser) is coaxially superimposed on the actual exciting light using beam splitter 17. It would also be possible to couple in one or more additional modes of the single (laser) light source that is used, the energy difference between the modes being adapted to the energy transition that needs to be attained.

The additionally introduced electromagnetic energy could also be pulsed or intensity-modulated, and moreover could be synchronizable with the scanning and/or detection operation of the laser scanning microscope. In particular, the pulse sequence or intensity modulation sequence of the electromagnetic radiation can exhibit an adjustable offset in time from the pulse sequence or intensity modulation sequence of the exciting light. This offset in time can be selected so as to maximize the signal yield from the markers that are to be detected.

Square-wave, sawtooth, or triangular profiles, and periodically recurring or random intensity profiles, are conceivable as intensity profiles over time of the pulsed or intensity-modulated exciting light and/or of the additionally introduced electromagnetic energy.

In conclusion, be it noted very particularly that the exemplary embodiments set forth above serve merely to describe the teaching claimed, but does not limit it to the exemplary embodiments selected in purely arbitrary fashion.

The invention has been described with respect to three specific embodiments. A skilled person can make amendments and alteration without leaving the scope of the appended claims.

PARTS LIST

1 Laser light source
2 Specimen
3 Detector, multi-band detector
4 Light returning from specimen, light returning to detector
5 Marker, semiconductor nanocrystal
6 Exciting light (from laser light source)
7 Light emitted by specimen
8 Illumination/detection beam path
9 Optical component, filter
10 Excitation pinhole
11 Scanning mirror
12 Optical axis
13 Objective
14 Detection pinhole

What is claimed is:

1. A laser scanning microscope, comprising:
a laser light source for illuminating a specimen and defining an illumination beam path;
a detector for detecting the light returning from the specimen and defining a detection beam path;
markers attached to at least to parts of the specimen wherein the markers can be excited to emit light, wherein the laser light source emits exciting light substantially at one wavelength;
an optical component positioned in the illumination beam path and the detection beam path and configured as an acousto-optic beam splitter, wherein the optical component reflects the exciting light arriving from the laser light source toward the specimen and allows light of a different wavelength to be transmitted toward the detector;
wherein different markers simultaneously emit light of different wavelengths when irradiated with exciting light of substantially the same wavelength; and,
wherein the detector is a multi-band detector for the simultaneous detection of light at several wavelengths.

2. The laser scanning microscope as defined in claim 1 wherein the multi-band detector defines a spectral region of individual channels which are adjustable to the wavelength of the emitted light of the markers.

3. The laser scanning microscope as defined in claim 2, wherein a crosstalk in the individual channels is minimized by the adjustment of the spectral regions of the individual channels.

4. The laser scanning microscope as defined in claim 1, wherein the markers are semiconductor nanocrystals.

5. The laser scanning microscope as defined in claim 4, wherein the semiconductor nanocrystals, upon excitation with exciting light of one wavelength, emit light at one wavelength.

6. The laser scanning microscope as defined in claim 4, wherein the semiconductor nanocrystals, upon excitation with exciting light of one wavelength, emit light at several wavelengths.

7. The laser scanning microscope as defined in claim 1, wherein markers are fluorochromes which, as a result of their specific absorption spectrum, are excited to fluoresce by the exciting light of one emission wavelength.

8. The laser scanning microscope as defined in claim 1, wherein several light sources are provided, so that the markers can be excited with exciting light of different wavelengths.

9. The laser scanning microscope as defined in claim 1, wherein the excitation of the markers consists essentially of pulsed exciting light and intensity-modulated exciting light.

10. The laser scanning microscope as defined in claim 8 or 9, wherein the exciting light is synchronized with the scanning and detection operation of the laser scanning microscope.

11. The laser scanning microscope as defined in claim 1, further comprising an additional energy source operatively arranged to excite the markers that are in an excited state.

12. The laser scanning microscope as defined in claim 11, wherein electromagnetic radiation from said additional energy source has a wavelength that can be selected from a region that can extend from the radio-frequency wavelength region to the UV wavelength region.

13. The laser scanning microscope as defined in claim 11, wherein electromagnetic radiation from said additional energy source is pulsed.

14. The laser scanning microscope as defined in claim 11, wherein electromagnetic radiation from said additional energy source is intensity-modulated.

15. The laser scanning microscope as defined in claim 11, wherein electromagnetic radiation from said additional energy source is synchronizable with the scanning and detection operation of the laser scanning microscope.

16. The laser scanning microscope as defined in claim 11, wherein a pulse sequence or intensity modulation sequence of electromagnetic radiation from said additional energy source exhibits an adjustable offset in time from a pulse sequence or intensity modulation sequence of the exciting light.

17. A method for the detection of biological specimens by laser scanning microscopy, comprises the steps of:

marking the specimen at least partially with markers that can be excited to emit light, illuminating the specimen with a laser light source defining an illumination beam path, wherein the laser light source emits exciting light at one wavelength;

detecting the light returning from the specimen by a detector defining a detection beam path, wherein different markers which emit light of different wavelengths when irradiated with exciting light of the same wavelength are used simultaneously; and providing an acousto-optic beam splitter as an optical component in the illumination beam path and the detection beam path, wherein the optical component reflects the exciting light arriving from the laser light source toward the specimen and allows light of a different wavelength to be transmitted toward the detector which is a multi-band detector for simultaneously detecting light at several wavelengths.

18. The method as defined in claim 17, wherein the multi-band detector defines individual channels for a spectral region which are adjustable to the wavelengths of the emitted light of the markers.

19. The method as defined in claim 18, wherein crosstalk in the individual channels is minimized in the adjustment of the spectral regions of the detection channels.

20. The method as defined in claim 17, wherein upon excitation with exciting light of one wavelength, semiconductor nanocrystals serving as markers emit light at one wavelength.

21. The method as defined in claim 17, wherein upon excitation with exciting light of one wavelength, semiconductor nanocrystals serving as markers emit light at several wavelengths.

22. The method as defined in claim 17, wherein as a result of their specific absorption spectrum, fluorochromes serving as markers are excited to fluoresce by the exciting light of one wavelength.

23. The method as defined in claim 17, wherein several light sources illuminate the markers with exciting light of different wavelengths.

24. The method as defined in claim 17, wherein the markers are excited with pulsed exciting light.

25. The method as defined in claim 17, wherein the markers are excited with intensity-modulated exciting light.

26. The method as defined in claim 24 or 25, wherein the exciting light is synchronized with the scanning and detection operation of the laser scanning microscope.

27. The method as defined in claim 25, wherein detection of the light emitted by the markers is performed at an offset in time from excitation of the markers.

28. The method as defined in claim 27, wherein the offset in time between excitation of the markers and detection of the light emitted by the markers is adjusted so as to maximize the signal yield.

29. The method as defined in claim 17, wherein the markers that are in an excited state are additionally excited with electromagnetic radiation of an additional energy source.

30. The method as defined in claim 29, wherein the electromagnetic radiation has a wavelength that is selected from a region that can extend from the radio-frequency wavelength region to the UV wavelength region.

31. The method as defined in claim 30, wherein pulsed radiation is used as the electromagnetic radiation.

32. The method as defined in claim 30, wherein intensity-modulated radiation is used as the electromagnetic radiation.

33. The method as defined in claim 29, wherein the electromagnetic radiation of the additional energy source is synchronized with the scanning and detection operation of the laser scanning microscope.

34. The method as defined in claim 31, wherein an offset in time is established between a pulse sequence or intensity modulation sequence of the electromagnetic radiation and a pulse sequence or intensity modulation sequence of the exciting light.

* * * * *